Feb. 19, 1935. R. A. FESSENDEN 1,991,892
HEIGHT INDICATOR
Filed Jan. 18, 1922
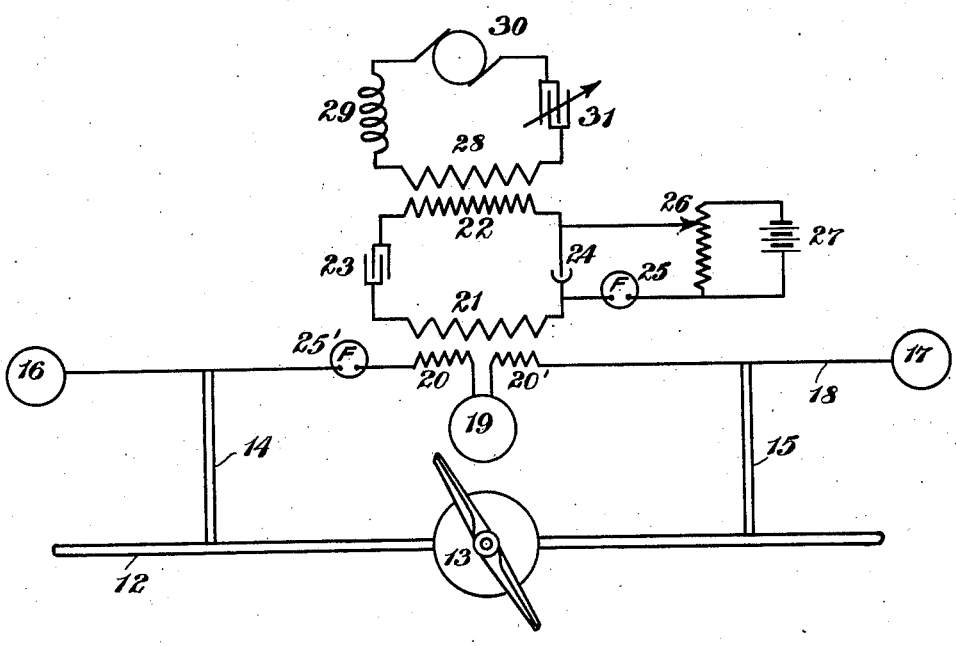
Inventor:
Reginald A. Fessenden.
By his attorneys.

Patented Feb. 19, 1935

1,991,892

UNITED STATES PATENT OFFICE 1,991,892

HEIGHT INDICATOR

Reginald A. Fessenden, Chestnut Hill, Mass.

Application January 18, 1922, Serial No. 530,162

1 Claim. (Cl. 177—352)

My invention relates to methods and means for determining the height above ground of aeroplanes and the like, and has for its object the better efficiency, reliability and convenience of making such measurements.

The figure accompanying this specification shows, partly diagrammatically, means suitable for carrying out my invention.

Here 11 is the ground; 12 an aeroplane wing; 13 its motor and propeller; 14 and 15 are struts supporting the antenna 18; 16, 17 are capacity termination surfaces of the antenna; 19, 30 are sources for generating radio-frequency oscillations, for example of the type shown in applicant's U. S. Patents 706,737, filed May 29th, 1901 and 706,741, filed Nov. 5th, 1901 and 897,279, filed Dec. 17th, 1906; and U. S. abandoned application 222,-301, filed Aug. 26th, 1904, showing method of generating oscillations by mercury lamp, also by "fly-wheel circuit"; or, as shown by DeForest's brilliant invention, the audion generator.

20, 20', 21, 22, 28 are elements of transformers, as shown; 31 is a variable capacity; 29 an inductance; 23 a large fixed capacity; 24 a liquid barretter; 25 a telephone receiver, or as shown, a frequency meter; 26 a variable resistance; 27 a battery; the whole forming a rectifying heterodyne, as shown in applicant's U. S. abandoned application 286,914, filed Nov. 11th, 1905 and applicant's U. S. companion patents, 1,156,677, Fig. 4 and specification p. 3, lines 46-51, and 1,141,386; both filed Aug. 26th, 1904.

In operation, the aeroplane is flown to such a height that the earth does not affect the capacity or frequency of the antenna 18, and the antenna oscillates at its natural period, say 500,000. The circuit 29, 30, 31, 28 is then tuned by the variable condenser 31 so that a small number of beats per second is produced in the indicator 25 and the frequency of this circuit is slightly higher than that of the antenna 18.

If now the aeroplane approaches the ground, the capacity of the antenna will increase, and the beats will become of higher frequency and louder. If a telephone is used as an indicator, or if a frequency meter be used, as shown, it will indicate a higher frequency.

If desired, the change of frequency may be read directly by the frequency meter 25', and the heterodyne system omitted; but the heterodyne is much more reliable and efficient, and shows small changes in height much better.

It is well known in the art that setting the plates of a to-and-fro moving plate condenser by turning the screws adjusting the distance between them, (see Fleming, Electric Wave Telegraphy, p. 128, and the calibration curves connecting capacity and distance furnished with such types of variable capacity by White and Co. of Glasgow and the National Electric Signaling Co. 1907), is in reality setting the plates to a certain distance apart, and that measuring the capacity of a certain setting is really measuring the distance, which is shown on the calibration curves.

This method of determining distance is not however practicable for determining the height of aeroplanes for it would necessitate the aeroplane dropping a conducting wire to ground to make connection with the ground for said wire would get entangled. Applicant employs an entirely new method which obviates this difficulty, i. e. applicant makes the two opposite poles of the antennæ the capacities and varies their mutual capacity by bringing them in proximity to a third conducting or dielectric surface, i. e. the ground, or sea. In this way the distance is not determined between the plates or electrodes of the two capacities, but between the two capacities and a third body, i. e. the earth or sea, and no trailing wire is necessary, and the calibration can be very accurate so that a heterodyne system for reading direct may be used without danger of mistake and the arrangement is readily calibrated by flying so high that the third body produces no appreciable effect while the two capacities remain in exactly the same relation as before.

What I claim is:—

An apparatus for determining the distance of an aircraft from the earth, comprising a pair of oscillatory circuits arranged upon the aircraft in influencing relation to each other, means for bringing said circuits into resonance with each other, capacity elements arranged in one circuit which will be influenced by any change in distance between the aircraft and the earth and cause said oscillatory circuits to become non-resonant and produce a beat note, and means for measuring said beat note to calculate the change of capacity to measure said distance.

REGINALD A. FESSENDEN.